(12) United States Patent
Masumura et al.

(10) Patent No.: US 11,887,620 B2
(45) Date of Patent: Jan. 30, 2024

(54) LANGUAGE MODEL SCORE CALCULATION APPARATUS, LANGUAGE MODEL GENERATION APPARATUS, METHODS THEREFOR, PROGRAM, AND RECORDING MEDIUM

(71) Applicant: NIPPON TELEGRAPH AND TELEPHONE CORPORATION, Tokyo (JP)

(72) Inventors: Ryo Masumura, Tokyo (JP); Tomohiro Tanaka, Tokyo (JP); Takanobu Oba, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 225 days.

(21) Appl. No.: 17/429,169

(22) PCT Filed: Jan. 27, 2020

(86) PCT No.: PCT/JP2020/002650
§ 371 (c)(1),
(2) Date: Aug. 6, 2021

(87) PCT Pub. No.: WO2020/162240
PCT Pub. Date: Aug. 13, 2020

(65) Prior Publication Data
US 2022/0013136 A1    Jan. 13, 2022

(30) Foreign Application Priority Data
Feb. 8, 2019 (JP) ................. 2019-021546

(51) Int. Cl.
*G10L 25/30* (2013.01)
*G06N 3/08* (2023.01)
*G10L 25/51* (2013.01)

(52) U.S. Cl.
CPC ............. *G10L 25/30* (2013.01); *G06N 3/08* (2013.01); *G10L 25/51* (2013.01)

(58) Field of Classification Search
CPC .............................. G10L 25/30; G10L 25/51
(Continued)

(56) References Cited

U.S. PATENT DOCUMENTS 9,304,796 B1 *  4/2016  Douglas ............. G06F 11/0712
10,810,357 B1 * 10/2020  Tsypliaev ............ G06F 3/0484
(Continued)

OTHER PUBLICATIONS

P. Mirowski, S. Chopra, S. Balakrishnan and S. Bangalore, "Feature-rich continuous language models for speech recognition," 2010 IEEE Spoken Language Technology Workshop, Berkeley, CA, USA, 2010, pp. 241-246, doi: 10.1109/SLT.2010.5700858. (Year: 2010).*

(Continued)

*Primary Examiner* — Bharatkumar S Shah

(57) ABSTRACT

The present invention improves the accuracy of language prediction. A history speech meta-information understanding unit 11 obtains a history speech meta-information vector from a word string of a preceding speech using a meta-information understanding device. A history speech embedding unit 12 converts the word string of the preceding speech and a speaker label into a history speech embedding vector. A speech unit combination vector construction unit 13 obtains a speech unit combination vector by combining the history speech meta-information vector and the history speech embedding vector. A speech sequence embedding vector calculation unit 14 converts a plurality of speech unit combination vectors obtained for the past speech sequences to a speech sequence embedding vector. A language model score calculation unit 15 calculates a language model score of a current speech from a word string of the current speech, a speaker label, and a speech sequence embedding vector.

14 Claims, 4 Drawing Sheets

(58) Field of Classification Search
USPC .......................................................... 704/200
See application file for complete search history.

(56) References Cited

U.S. PATENT DOCUMENTS

| | | | |
|---|---|---|---|
| 10,943,583 B1* | 3/2021 | Gandhe | ................. G10L 15/183 |
| 2005/0119885 A1* | 6/2005 | Axelrod | ................ G10L 15/063 |
| | | | 704/231 |
| 2012/0150532 A1* | 6/2012 | Mirowski | ............... G06F 40/40 |
| | | | 704/E11.001 |

OTHER PUBLICATIONS

P. Mirowski, S. Chopra, S. Balakrishnan and S. Bangalore, "Feature-rich continuous language models for speech recognition," 2010 IEEE Spoken Language Technology Workshop, Berkeley, CA, USA, 2010, pp. 241-246, doi: 10.110 (Year: 2010).*

Mikolov et al. (2010) "Recurrent neural network based language model" Interspeech, Sep. 26, 2010, pp. 1045-1048.

Masumura et al. (2018) "Role Play Dialogue Aware Language Models based on Conditional Hierarchical Recurrent Encoder-Decoder" Annual Conference of the International Speech Communication Association (Interspeech), Sep. 2, 2018, pp. 1259-1263.

\* cited by examiner

LANGUAGE MODEL SCORE CALCULATION APPARATUS, LANGUAGE MODEL GENERATION APPARATUS, METHODS THEREFOR, PROGRAM, AND RECORDING MEDIUM

CROSS-REFERENCE TO RELATED APPLICATIONS

This application is a U.S. 371 Application of International Patent Application No. PCT/JP2020/002650, filed on 27 Jan. 2020, which application claims priority to and the benefit of JP Application No. 2019-021546, filed on 8 Feb. 2019, the disclosures of which are hereby incorporated herein by reference in their entireties.

TECHNICAL FIELD

The present invention relates to a technique for learning a language model used in speech recognition, machine translation, and the like.

BACKGROUND ART

In speech recognition and machine translation, a language model is necessary for linguistic prediction. The language model can measure a language model score (probability) representing linguistic likelihood, and its performance affects the performance of speech recognition and machine translation. Various types of language models have been proposed so far, but in recent years, language models based on recurrent neural networks have been attracting attention. For details of the language model based on recurrent neural networks, refer to, for example, NPL 1 and so on.

Language models based on recurrent neural networks have very high language prediction capabilities and are actively used in speech recognition and machine translation. The point of the language model based on recurrent neural networks is that by using the recurrent neural network, it is possible to perform language prediction that reflects a long-range context within the range of the speech. Specifically, when measuring the linguistic likelihood of words from the beginning of a certain speech to the tenth word, the information of words from the beginning to the preceding ninth word can be considered as context information.

In a language model based on general recurrent neural networks, the language model score is measured in consideration of long-range context information within the range of the speech, but in a conversation or the like, not only the context information within the range of the speech but also the speech sequences earlier than the speech should be considered as the context information. Thus, in recent years, a technique for measuring a language model score of a certain speech in consideration of the interaction between speakers in the speech sequences earlier than the speech in the conversation of a plurality of persons as the context information has been studied. In this specification, this technique is referred to as a "multi-party conversation context-aware language model".

A multi-party conversation context-aware language model has a function of calculating the prediction probability of the word of the speech by explicitly utilizing the information such as who spoke what so far in a multi-party conversation. It is possible to calculate a language model score with higher prediction performance than a general recurrent neural network. As a result, a speech recognition system with high speech recognition performance can be constructed using a multi-party conversation context-aware language model. For details of the multi-party conversation context-aware language model, refer to NPL 2.

CITATION LIST

Non Patent Literature

[NPL 1] Mikolov Tomas, Karafiat Martin, Burget Lukas, Cernocky Jan, Khudanpur Sanjeev, "Recurrent neural network based language model", INTERSPEECH 2010, pp. 1045-1048, 2010.
[NPL 2] Ryo Masumura, Tomohiro Tanaka, Atsushi Ando, Hirokazu Masataki, Yushi Aono, "Role Play Dialogue Aware Language Models based on Conditional Hierarchical Recurrent Encoder-Decoder", In Proc. Annual Conference of the International Speech Communication Association (INTERSPEECH), pp. 1259-1263, 2018.

SUMMARY OF THE INVENTION

Technical Problem

In the multi-party conversation context-aware language model, only the word string and the speaker information of each speech are used when using the speech sequences earlier than a speech as context information. However, since the meta-information included in each speech, which can be context information for the speech, is not clearly understood, the context information is insufficient. Here, various types of meta-information are considered, and examples thereof include speech intentions representing "agreement", "question", "gratitude", and the like, topics representing "sports", "economy", "entertainment", and the like.

Specifically, for example, when a speech immediately before the speech is "Is that so", it becomes very difficult to predict what language is likely to appear in the speech if it is not possible to determine whether this speech represents "question" or "agreement". Moreover, for example, when a speech immediately before the speech is "Tell me the result of yesterday's night game", it is considered that the accuracy of language prediction of next speech varies greatly depending on whether the topic of the speech can be specifically predicted to be "sports" or not.

Therefore, the problem to be solved by the present invention is that the conventional multi-party conversation context-aware language model does not explicitly understand the meta-information included in each past speech that can be the context information of the speech, which makes language prediction difficult. That is, an object of the present invention is to improve the accuracy of language prediction in a language model that uses the past speech sequences as context information.

Means for Solving the Problem

A language model score calculation device according to a first aspect of the present invention includes: a history speech meta-information understanding unit that obtains a history speech meta-information vector representing meta-information of a preceding speech using a meta-information understanding device regarding at least one piece of meta-information from a word string of the preceding speech; a history speech embedding unit that converts the word string of the preceding speech and a speaker label representing a speaker of the preceding speech to a history speech embedding vector using a model parameter of a language model;

a speech unit combination vector construction unit that combines the history speech meta-information vector and the history speech embedding vector to obtain a speech unit combination vector; a speech sequence embedding vector calculation unit that converts a plurality of speech unit combination vectors obtained for past speech sequences to a speech sequence embedding vector using the model parameter of the language model; and a language model score calculation unit that calculates a language model score of a current speech from a word string of the current speech, a speaker label representing a speaker of the current speech, and the speech sequence embedding vector using the model parameter of the language model.

A language model creation device according to a second aspect of the present invention includes: a meta-information model parameter learning unit that learns a model parameter of a meta-information understanding device from learning data made up of a set of a speech regarding at least one piece of meta-information and meta-information of each speech; and a language model parameter learning unit that learns a model parameter of a language model from conversation data made up of a set of a plurality of speeches of a plurality of persons and a speaker label representing a speaker of each speech using a model parameter of the meta-information understanding device.

Effects of the Invention

According to the present invention, the accuracy of language prediction in a language model that uses past speech sequences as context information is improved. By using this language model for speech recognition, machine translation, and the like, it is possible to improve speech recognition performance and translation performance.

DESCRIPTION OF EMBODIMENTS

Figure 1:
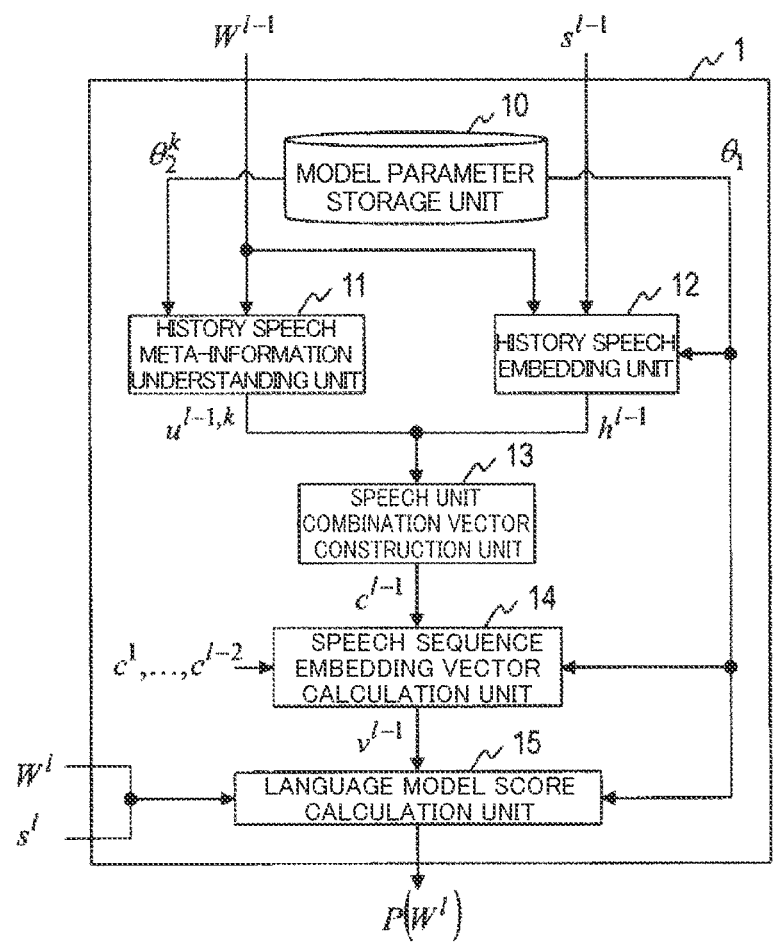
FIG. 1 is a diagram illustrating a functional configuration of a language model score calculation device.

In the following description, the symbol "^" used in the text should be written directly above a character immediately after the symbol, but due to the restriction of the text notation, it is written immediately before the character. In mathematical expressions, these symbols are described at their original positions, that is, directly above the characters. For example, "^θ" is represented by the following expression in mathematical expressions.

$\hat{\theta}$[Math. 1]

In the present invention, in order to solve the above-mentioned problems, a method of estimating one or more types of meta-information included in each past speech that is context information of the speech in a multi-party conversation context-aware language model, calculating a prediction probability for language prediction using the estimated meta-information of each speech as context information along with the word string and speaker information, and calculating a language model score based thereon is introduced. Therefore, the multi-party conversation context-aware language model of the present invention includes a number of meta-information understanding devices corresponding to the number of types of meta-information to be estimated.

In addition, a method of optimizing the multi-party conversation context-aware language model having the above-mentioned function and a number of included meta-information understanding devices corresponding to the number of types of meta-information to be estimated using learning data for predicting meta-information for each type of meta-information (multiple data sets of a pair of speech and meta-information) and learning data of a conversation of multiple people (a sequence of word strings with speaker labels).

Hereinafter, embodiments of the present invention will be described in detail. In the drawings, components having the same function are denoted by the same reference numerals, and redundant description will be omitted.

First Embodiment: Language Model Score Calculation Device

Figure 2:
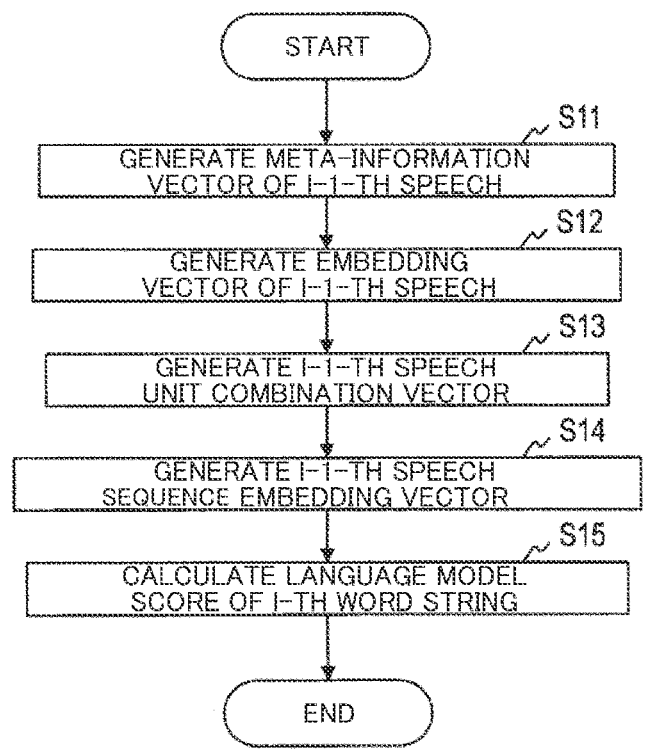
FIG. 2 is a diagram illustrating a processing procedure of a language model score calculation method.

As illustrated in FIG. 1, a language model score calculation device 1 of the first embodiment includes a model parameter storage unit 10, a history speech meta-information understanding unit 11, a history speech embedding unit 12, a speech unit combination vector construction unit 13, a speech sequence embedding vector calculation unit 14, and a language model score calculation unit 15. The language model score calculation device 1 performs the steps of processing illustrated in FIG. 2 whereby a language model score calculation method of the first embodiment is realized.

The language model score calculation device 1 is a special device configured, for example, by loading a special program into a known or dedicated computer having a central processing unit (CPU: Central Processing Unit), a main storage device (RAM: Random Access Memory), and the like. The language model score calculation device 1 executes each process under the control of the central processing unit, for example. The data input to the language model score calculation device 1 and the data obtained by each process are stored in the main storage device, for example, and the data stored in the main storage device is read to the central processing unit as necessary and used for other processing. At least a part of each processing unit of the language model score calculation device 1 may be configured by hardware such as an integrated circuit. For example, each storage unit included in the language model score calculation device 1 can be configured by a main storage device such as a RAM (Random Access Memory), an auxiliary storage device configured by a hard disk, an optical disc, or a semiconductor memory device such as a flash memory, or middleware such as a relational database or key-value store.

The language model score calculation device 1 according to the first embodiment receives a sequence $W^1, \ldots, W^L$ of L pieces of word strings for each continuous speech and a sequence $s^1, \ldots, s^L$ of L pieces of speaker labels for each continuous speech as an input and obtains and outputs a language model score $P(W^1), \ldots, P(W^L)$ of the sequence of L_pieces of continuous word strings by the probability calculation based on a model parameter $\theta_1$ of a language model and model parameters $\theta_2^1, \ldots, \theta_2^K$ of K pieces of meta-information understanding devices. Strictly speaking, the language model score $P(W^l)$ of the l-th speech is represented as follows.

$$P(W^l) \approx P(W^l|W^1, \ldots, W^{l-1}, s^1, \ldots, s^l, \theta_1, \theta_2^1, \ldots, \theta_2^K)$$ [Math. 2]

The language model score calculation device 1 realizes the above-mentioned processing by repeating the processing for each speech unit. In the following, the details of the processing of the l-th speech unit (l=1, ..., L) will be described.

The model parameter storage unit 10 stores in advance the model parameter $\theta_1$ of the language model and the model parameters $\theta_2^1, \ldots, \theta_2^K$ of the K pieces of meta-information understanding devices. These model parameters $\theta_1, \theta_2^1, \ldots, \theta_2^K$ are learned in advance by the language model creation device 2 described later.

In step S11, the history speech meta-information understanding unit 11 receives the word string $W^{l-1}$ of the l−1-th speech as an input, and for each integer k of 1 or more and K or less, obtains the k-th meta-information vector $u^{l-1,k}$ of the l−1-th speech by a conversion function based on the model parameter $\theta_2^k$ of the k-th meta-information understanding device. In this case, the word string $W^{l-1}$ of the l−1-th speech includes one or more words. The history speech meta-information understanding unit 11 outputs the obtained K types of meta-information vectors $u^{l-1,1}, \ldots, u^{l-1,K}$ to the speech unit combination vector construction unit 13.

The meta-information vector is a vector in which meta-information predicted from a word string is embedded. Various types of meta-information are considered, and examples thereof include speech intentions representing "agreement", "question", "gratitude", and the like, topics representing "sports", "economy", "entertainment", and the like. Each dimension of the meta-information vector can be associated with each element related to the meta-information. For example, the first dimension may be assigned to "speech intention of agreement" and the second dimension may be assigned to "speech intention of question". For example, a vector may be configured such that only the second dimension is 1 and the other dimensions are 0. In this case, any information can be used as the conversion function as long as the information can be extracted from the meta-information understanding device based on the model parameter $\theta_2^k$. Specifically, any function can be used as long as it is a function for converting a variable-length symbol string to a single vector.

As the meta-information understanding device, any device can be used as long as it estimates the meta-information prediction probability distribution from a word string. For example, the meta-information understanding device can be constructed using a recurrent neural network, a bidirectional recurrent neural network, and a softmax function. The conversion function may be a conversion function that configures a meta-information vector such that the dimension corresponding to the label predicted by the meta-information understanding device is 1 and the remaining dimensions are 0, for example. Moreover, the posterior probability distribution of the meta-information predicted by the meta-information understanding device may be directly used as the meta-information vector. Furthermore, an intermediate representation when estimating using a meta-information understanding device may be used. For example, in the case of a meta-information understanding device using the recurrent neural network, the bidirectional recurrent neural network and softmax function, a vector representation obtained before passing through the softmax function may be directly used as the meta-information vector.

In step S12, the history speech embedding unit 12 receives the word string $W^{l-1}$ of the l−1-th speech and the word label $s^{l-1}$ of the l−1-th speech as an input and obtains the history speech embedding vector $h^{l-1}$ of the l−1-th speech by a conversion function based on the model parameter 91 of the language model. The history speech embedding vector is a vector in which the information of the word string and the speaker label are embedded. In this case, any function can be used as the conversion function as long as it is a function for converting a variable-length symbol string to a single vector. For example, a recurrent neural network and a bidirectional recurrent neural network can be used. The history speech embedding unit 12 outputs the obtained history speech embedding vector $h^{l-1}$ to the speech unit combination vector construction unit 13.

In step S13, the speech unit combination vector construction unit 13 receives the K types of meta-information vectors $u^{l-1,1}, \ldots, u^{l-1,K}$ of the l−1-th speech output by the history speech meta-information understanding unit 11 and the history speech embedding vector $h^{l-1}$ of the l−1-th speech output by the history speech embedding unit 12 as an input and obtains the speech unit combination vector $c^{l-1}$ of the l−1-th speech. The speech unit combination vector construction unit 13 outputs the obtained speech unit combined vector $c^{l-1}$ to the speech sequence embedding vector calculation unit 14.

The speech unit combination vector $c^{l-1}$ is configured as follows.

$$c^{l-1} = [h^{l-1T}, u^{l-1,1T}, \ldots, u^{l-1,KT}]^T$$ [Math. 3]

Here, $^T$ (superscript T) represents the transpose of the vector.

In step S14, the speech sequence embedding vector calculation unit 14 receives a plurality of speech unit combination vectors $c^1, \ldots, c^{l-1}$ obtained for the past speech sequences as an input and obtains the l−1-th speech sequence embedding vector $v^{l-1}$ by a conversion function based on the model parameter $\theta_l$ of the language model. In this case, any function can be used as the conversion function as long as it is a function for converting a variable-length vector sequence to a single vector. For example, a recurrent neural network can be used. The speech sequence embedding vector calculation unit 14 outputs the obtained speech sequence embedding vector $v^{l-1}$ to the language model score calculation unit 15.

In step S15, the language model score calculation unit 15 receives the word string $W^l$ of the l-th speech, the speaker label $s^l$ of the l-th speech, and the l−1-th speech sequence embedding vector $v^{l-1}$ as an input and obtains the language model score $P(W^l)$ of the l-th speech on the basis of a conversion function based on the model parameter $\theta_l$ of the language model. In this case, the conversion function can be represented using a recurrent neural network that performs auto-regression, a bidirectional recurrent neural network, and a softmax function. For example, using a conversion function that predicts the m+1-th word from the m-th word of the l-th speech, the speaker label $s^l$ of the l-th speech, and the l−1-th speech sequence embedding vector $v^{l-1}$, it is possible to obtain the probability of each word of the l-th speech $W^l$ and calculate the language model score $P(W^l)$ on the basis of the probability.

The language model score calculation device 1 performs the processing of above-mentioned steps S11 to S15 for each of the input L pieces of speeches $W^1, \ldots, W^L$ and outputs the language model scores $P(W^1), \ldots, P(W^L)$ of the obtained L pieces of speeches.

Second Embodiment: Language Model Creation Device

Figure 3:
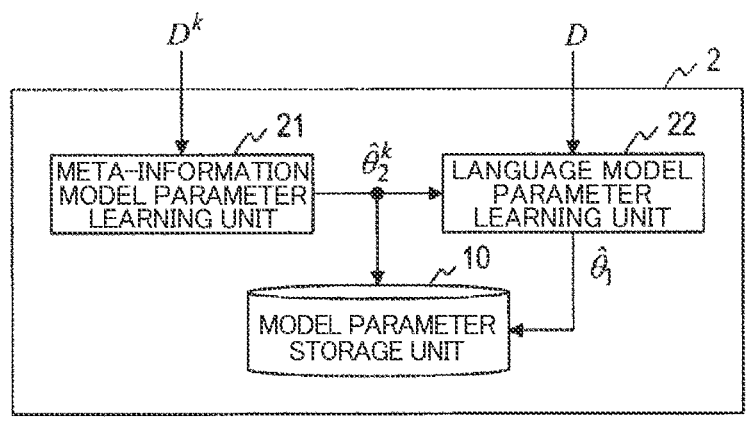
FIG. 3 is a diagram illustrating a functional configuration of a language model creation device.
Figure 4:
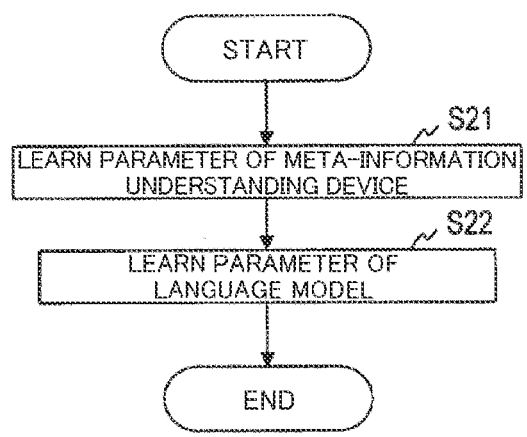
FIG. 4 is a diagram illustrating a processing procedure of a language model creation method.

As illustrated in FIG. 3, a language model creation device 2 of the second embodiment includes a meta-information model parameter learning unit 21, a language model parameter learning unit 22, and a model parameter storage unit 10. The language model creation method of the second embodiment is realized by the language model creation device 2 performing the processing of each step illustrated in FIG. 4.

The language model creation device 2 is a special device configured, for example, by loading a special program into a known or dedicated computer having a central processing unit (CPU: Central Processing Unit), a main storage device (RAM: Random Access Memory), and the like. The language model creation device 2 executes each process under the control of the central processing unit, for example. The data input to the language model creation device 2 and the data obtained by each process are stored in the main storage device, for example, and the data stored in the main storage device is read to the central processing unit as necessary and used for other processing. At least a part of each processing unit of the language model creation device 2 may be configured by hardware such as an integrated circuit. For example, each storage unit included in the language model creation device 2 can be configured by a main storage device such as a RAM (Random Access Memory), an auxiliary storage device configured by a hard disk, an optical disc, or a semiconductor memory device such as a flash memory, or middleware such as a relational database or key-value store.

The language model creation device 2 of the second embodiment receives learning data $D^1, \ldots, D^K$ for each of K pieces of meta-information and multi-party conversation data D as an input and learns the model parameter $\theta_1$ of the language model and model parameters $\theta_2^1, \ldots, \theta_2^K$ of K pieces of meta-information understanding devices.

The learning data $D^k$ regarding the k-th meta-information is a plurality of pieces of data made up of a set of speech $W_n^k$ and meta-information $L_n^k$, and can be represented by the following equation. Here, n is an integer of 1 or more and $N^k$ or less, and $N^k$ represents the number of pieces of learning data regarding the k-th meta-information.

$$D^k = \{(W_1^k, L_1^k), \ldots, (W_{N_k}^k, L_{N_k}^k)\} \qquad \text{[Math. 4]}$$

The multi-party conversation data D is a plurality of pieces of data made up of a set of a word string $W^l$ and a speaker label $s^l$ for each speech included in a conversation and can be represented by the following equation. Here, l is an integer of 1 or more and L or less, and L represents the number of speeches included in the conversation.

$$D = \{(W^1, s^1), \ldots, (W_L, s_L)\} \qquad \text{[Math. 5]}$$

In step S21, the meta-information model parameter learning unit 21 receives the learning data $D^k$ regarding the k-th meta-information for each integer k of 1 or more and K or less as an input and learns the model parameter $\hat{\theta}_2^k$ of the k-th meta-information understanding device. For example, 10,000 sets of speeches $W_n^k$ and meta-information $L_n^k$ included in the learning data $D^k$ are prepared (that is, $N^k$=10,000). The meta-information model parameter learning unit 21 outputs the obtained model parameters $\hat{\theta}_2^1, \ldots, \hat{\theta}_2^K$ of the K types of meta-information understanding devices to the language model parameter learning unit 22.

The model parameter $\hat{\theta}_2^k$ optimized by the learning data $D^k$ follows the following equation.

$$\hat{\theta}_2^k = \underset{\theta}{\operatorname{argmax}} \prod_{n=1}^{N^k} P(L_n^k | W_n^k, \theta_2^k) \qquad \text{[Math. 6]}$$

Here, $P(L_n^k | W_n^k, \theta_2^k)$ is the same as the meta-information understanding device defined by the history speech meta-information understanding unit 11 of the language model score calculation device 1, and any device can be used as long as it estimates the meta-information prediction probability distribution from a word string. For example, the meta-information understanding device can be constructed using a recurrent neural network, a bidirectional recurrent neural network, and a softmax function. The model parameter $\hat{\theta}_2^k$ learned herein is used as a model parameter $\theta_2^k$ of the meta-information understanding device of the language model score calculation device 1.

In step S22, the language model parameter learning unit 22 receives the multi-party conversation data D and the model parameters $\hat{\theta}_2^1, \ldots, \hat{\theta}_2^K$ of the K types of meta-information understanding devices as an input and learns the model parameter $\hat{\theta}_1$ of the language model. For example, 100,000 sets of the speech $W^l$ and the speaker label $s^l$ included in the multi-party conversation data D are prepared (that is, L=100,000).

The parameter $\hat{\theta}_l$ optimized by the multi-party conversation data D follows the following equation.

$$\hat{\theta}_1 = \underset{\theta_1}{\operatorname{argmax}} \prod_{l=1}^{L} P(W^l) \qquad \text{[Math. 7]}$$

$$= \underset{\theta_1}{\operatorname{argmax}} \prod_{l=1}^{L} P(W^l | W^1, \ldots, W^{l-1}, s^1, \ldots, s^l, \theta_1, \hat{\theta}_2^1 \ldots, \hat{\theta}_2^K)$$

Note that $P(W^l | W^1, \ldots, W_{l-1}, s^1, \ldots, s_l, \theta_1, \hat{\theta}_2^1, \ldots, \hat{\theta}_2^K)$ can be calculated according to the flow of calculation defined in the language model score calculation device 1. Here, $\theta_l$ is the model parameter learned herein, and $\hat{\theta}_2^1, \ldots, \hat{\theta}_2^K$ are model parameters optimized in the meta-information model parameter learning unit 21. Using the model parameter $\hat{\theta}_l$ optimized herein as the model parameter $\theta_l$ of the language model in the language model score calculation device 1, it is possible to realize the language model score calculation device 1 that reflects the learned information.

The language model creation device 2 stores the model parameter $\theta_l$ of the language model obtained by the processes of steps S21 to S22 and the model parameters $\hat{\theta}_2^1, \ldots, \hat{\theta}_2^K$ of the K types of meta-information understanding devices in the model parameter storage unit 10. Alternatively, the obtained model parameter $θ_l$ of the language model and the model parameters $\hat{θ}_2^1, \ldots, \hat{θ}_2^K$ of the K types of meta-information understanding devices are stored as they are in order to be stored in another device that uses the language model and the meta-information understanding device. In this case, the language model creation device 2 may not include the model parameter storage unit 10.

Modified Example

In the above-described embodiment, an example in which the language model score calculation device 1 and the language model creation device 2 are configured as separate devices has been described. However, the language model score calculation device 1 and the language model creation device 2 may be configured as one language model score calculation device that has a function of learning a language model and a model parameter of a meta-information understanding device and a function of calculating a language model score using the learned model parameter. That is, the language model score calculation device of the modified example includes the meta-information model parameter learning unit 21, the language model parameter learning unit 22, the model parameter storage unit 10, the history speech meta-information understanding unit 11, the history speech embedding unit 12, the speech unit combination vector construction unit 13, the speech sequence embedding vector calculation unit 14, and the language model score calculation unit 15.

While embodiments of the present invention have been described, a specific configuration is not limited to these embodiments. Modifications can be appropriately made in design or the like within a scope without departing from the spirit of the present invention, which naturally fall within the scope of the present invention. The various types of processes described in the embodiments may be executed in a time-series manner according to the described order. Alternatively, the processes may be executed in parallel or individually depending on the processing capability of the device that executes the processes or as required.

[Program and Recording Medium]

In cases where various processing functions of each device described in the embodiments are implemented by a computer, the processing details of the functions to be included in each device are described as a program. The program is executed by the computer, whereby various processing functions of each device described above are realized on the computer.

The program that describes the processing details may be recorded on a computer-readable recording medium. The computer-readable recording medium may be any recording medium, such as, for example, a magnetic recording device, an optical disc, a magneto-optical recording medium, or a semiconductor memory.

The program is distributed by, for example, selling, transferring, or lending a portable recording medium, such as DVD or CD-ROM, on which the program is recorded. Alternatively, the program may be stored in a storing device of a server computer, and the program may be transferred from the server computer to another computer via a network, whereby the program is distributed.

For example, the computer for executing such a program, first, stores the program recorded on the portable recording medium or the program transferred from the server computer temporarily in its storage device. In execution of the process, the computer reads the program recorded on its storage device and executes the process according to the read program. According to another execution mode of this program, the computer may directly read the program from the portable recording medium and execute the process according to the program. Alternatively, every time the program is transferred to this computer from the server computer, the computer may successively execute the process according to the received program. The process described above may be executed by a so-called ASP (Application Service Provider)-type service in which the program is not transferred from the server computer to this computer, but the processing function is achieved only by an execution instruction and the acquisition of the result. The program according to this embodiment encompasses information that is provided for the process by an electronic computer and conforms to the program (data and the like that are not direct instructions to the computer but have characteristics that define the process of the computer).

In this mode, this device is configured by executing a predetermined program on the computer. Alternatively, at least some of these processing details may be achieved by hardware.

REFERENCE SIGNS LIST

1 Language model score calculation device
10 Model parameter storage unit
11 History speech meta-information understanding unit
12 History speech embedding unit
13 Speech unit combination vector construction unit
14 Speech sequence embedding vector calculation unit
Language model score calculation unit
2 Language model creation device
21 Meta-information model parameter learning unit
22 Language model parameter learning unit

The invention claimed is:

1. A language model score calculation device comprising a processor configured to execute operations comprising:

determining a history speech meta-information vector, wherein the history speech meta-information vector represents meta-information of a preceding speech using a meta-information understanding device regarding at least one piece of meta-information from a word string of the preceding speech;

converting the word string of the preceding speech and a speaker label representing a speaker of the preceding speech to a history speech embedding vector using a model parameter of a language model;

combining the history speech meta-information vector and the history speech embedding vector to obtain a speech unit combination vector;

converting a plurality of speech unit combination vectors obtained for past speech sequences to a speech sequence embedding vector using the model parameter of the language model; and determining a language model score of a current speech from a word string of the current speech, a speaker label representing a speaker of the current speech, and the speech sequence embedding vector using the model parameter of the language model.

2. The language model score calculation device according to claim 1, wherein the meta-information includes at least one of speech intentions representing:
agreement, question, or gratitude.

3. The language model score calculation device according to claim 1, wherein the meta-information includes at least one of topics representing sports, economy, or entertainment.

4. The language model score calculation device according to claim 1, wherein the converting the word string of the preceding speech and the speaker label uses at least one of a recurrent neural network or a bidirectional recurrent neural network.

5. The language model score calculation device according to claim 1, wherein the determining the language model score further comprises using one or more of a recurrent neural network that performs auto-regression, a bidirectional recurrent neural network, and a softmax function.

6. A language model creation device comprising a processor configured to execute operations comprising:
learning a model parameter of a meta-information understanding device from learning data, wherein the learning data include a set of a speech regarding at least one piece of meta-information and meta-information of each speech; and
learning a model parameter of a language model from conversation data, wherein the conversation data include made up of a set of a plurality of speeches of a plurality of persons and a speaker label representing a speaker of each speech using the model parameter of the meta-information understanding device.

7. The language model creation device according to claim 6, wherein the meta-information understanding device includes one or more of a recurrent neural network, a bidirectional recurrent neural network, and a softmax function.

8. A method comprising:
determining a history speech meta-information vector, wherein the history speech meta-information vector represents meta-information of a preceding speech using a meta-information understanding device regarding at least one piece of meta-information from a word string of the preceding speech;
converting the word string of the preceding speech and a speaker label representing a speaker of the preceding speech to a history speech embedding vector using a model parameter of a language model;
combining the history speech meta-information vector and the history speech embedding vector to obtain a speech unit combination vector;
converting a plurality of speech unit combination vectors obtained for past speech sequences to a speech sequence embedding vector using the model parameter of the language model; and
determining a language model score of a current speech from a word string of the current speech, the speaker label representing a speaker of the current speech, and the speech sequence embedding vector using the model parameter of the language model.

9. The method according to claim 8, the method further comprising:
learning a model parameter of the meta-information understanding device from learning data, wherein the learning data include of a set of a speech regarding the at least one piece of meta-information and meta-information of each speech; and
learning a model parameter of the language model from conversation data, wherein the conversation data include of a set of a plurality of speeches of a plurality of persons and a speaker label representing a speaker of each speech using a model parameter of the meta-information understanding device.

10. The method according to claim 9, wherein the meta-information understanding device includes one or more of a recurrent neural network, a bidirectional recurrent neural network, and a softmax function.

11. The method according to claim 8, wherein the meta-information includes at least one of speech intentions representing: agreement, question, or gratitude.

12. The method according to claim 8, wherein the meta-information includes at least one of topics representing sports, economy, or entertainment.

13. The method according to claim 8, wherein the converting the word string of the preceding speech and the speaker label uses at least one of a recurrent neural network or a bidirectional recurrent neural network.

14. The method according to claim 8, wherein the determining the language model score further comprises using one or more of a recurrent neural network that performs auto-regression, a bidirectional recurrent neural network, and a softmax function.

* * * * *